United States Patent
Fry et al.

(10) Patent No.: US 8,289,640 B2
(45) Date of Patent: *Oct. 16, 2012

(54) ERROR BURST DETECTION AND AMELIORATION

(75) Inventors: Scott Milton Fry, Oro Valley, AZ (US); Ernest Stewart Gale, Tucson, AZ (US); Kenji Nakamura, Sagamihara (JP); Hirokazu Nakayama, Fujisawa (JP); Pamela Ruth Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 925 days.

This patent is subject to a terminal disclaimer.

(21) Appl. No.: 12/189,613

(22) Filed: Aug. 11, 2008

(65) Prior Publication Data

US 2010/0033861 A1   Feb. 11, 2010

(51) Int. Cl.
  *G11B 27/36* (2006.01)
(52) U.S. Cl. ............ 360/31; 360/73.04; 360/77.12; 360/78.02; 714/47; 714/48
(58) Field of Classification Search .......... None
See application file for complete search history.

(56) References Cited

U.S. PATENT DOCUMENTS

| | | | | |
|---|---|---|---|---|
| RE30,187 E | | 1/1980 | Hong et al. ............ 340/146.1 |
| 4,916,701 A | | 4/1990 | Eggenberger et al. ...... 371/37.7 |
| 5,107,503 A | | 4/1992 | Riggle et al. ............. 371/37.1 |
| 5,253,126 A | * | 10/1993 | Richmond ............... 360/53 |
| 5,481,554 A | | 1/1996 | Kondo ................... 371/53 |
| 5,986,835 A | * | 11/1999 | Tanaka et al. ........... 360/53 |
| 6,026,468 A | * | 2/2000 | Mase et al. ............. 711/111 |
| 6,128,147 A | * | 10/2000 | Ebata et al. ............ 360/53 |
| 6,344,941 B1 | * | 2/2002 | Katada et al. ........... 360/51 |
| 6,512,644 B1 | * | 1/2003 | Hall et al. ............. 360/31 |
| 6,624,958 B1 | * | 9/2003 | Alva .................. 360/53 |
| 6,882,637 B1 | | 4/2005 | Le et al. ............... 370/349 |
| 6,947,709 B2 | * | 9/2005 | Kaindl ................ 455/67.7 |
| 6,958,878 B2 | * | 10/2005 | Jaquette et al. .......... 360/73.04 |
| 7,069,473 B2 | * | 6/2006 | Yasuda ................ 714/37 |
| 7,206,151 B2 | * | 4/2007 | Kimura et al. .......... 360/53 |
| 7,225,366 B2 | * | 5/2007 | Arao et al. ............. 714/47.2 |
| 7,301,718 B2 | * | 11/2007 | Ballard ................ 360/69 |
| 7,496,696 B2 | * | 2/2009 | Katagiri et al. .......... 710/29 |
| 7,509,568 B2 | * | 3/2009 | Kapur et al. ............ 714/799 |
| 7,821,728 B2 | * | 10/2010 | Fry et al. .............. 360/31 |
| 7,870,442 B2 | * | 1/2011 | Gale et al. ............. 714/48 |
| 2002/0159180 A1 | * | 10/2002 | McAllister et al. ........ 360/60 |
| 2006/0103961 A1 | * | 5/2006 | Sugawara et al. ......... 360/31 |
| 2006/0126211 A1 | * | 6/2006 | Sasaki ................ 360/74.4 |
| 2006/0238911 A1 | * | 10/2006 | MacKelden et al. ....... 360/69 |
| 2006/0256466 A1 | * | 11/2006 | Katagiri et al. .......... 360/75 |

OTHER PUBLICATIONS

"Enhanced Error Correction" IBM Technical Disclosure Bulletin, vol. 14, No. 11, Apr. 1972, pp. 3380-3381.

* cited by examiner

*Primary Examiner* — Dismery Mercedes
(74) *Attorney, Agent, or Firm* — Zilka-Kotab, PC (57) ABSTRACT

A method according to one embodiment includes monitoring a data transfer operation for detecting temporary errors; determining whether an error burst has occurred based on the monitoring; if an error burst has occurred, altering a condition of the data transfer operation; monitoring the data transfer operation having the altered condition for detecting temporary errors; determining whether another error burst has occurred based on the monitoring of the data transfer operation having the altered condition; and if another error burst has occurred; altering another condition of the data transfer operation. Additional systems and methods are also presented.

25 Claims, 5 Drawing Sheets

****READ MODE****

| Calib_selection | Enbl? | VelCk? | Sdiag Disable? | Fmt/Cart Disable? | OUTBOUND | |
|---|---|---|---|---|---|---|
| BURSTY_CALIB_NONE | TRUE | TRUE | FALSE | 0X00000000 | Indx-0 | Not a sticky/bursty condition |
| BURSTY_CALIB_GLBCLK | TRUE | TRUE | FALSE | 0X00000000 | Indx-1 | Disable Global Clock |
| BURSTY_CALIB_PLL | TRUE | TRUE | FALSE | 0X00000000 | Indx-2 | Chance clock settings |
| BURSTY_CALIB_SS | TRUE | TRUE | FALSE | 0X00000000 | Indx-3 | Saved Set Restore |
| BURSTY_CALIB_VPD | TRUE | TRUE | FALSE | 0X00000000 | Indx-4 | VPD Restore |
| BURSTY_CALIB_ERASE | FALSE | TRUE | FALSE | 0X00000000 | Indx-5 | Erase |
| BURSTY_CALIB_DSSRUN | TRUE | TRUE | FALSE | 0X00000000 | Indx-6 | DSS Restore |
| BURSTY_CALIB_SPD2 | TRUE | FALSE | FALSE | 0X00000000 | Indx-7 | Speed Change to 2 |
| BURSTY_CALIB_DSS2 | TRUE | FALSE | FALSE | 0X00000000 | Indx-8 | DSS Restore at Speed2 |
| BURSTY_CALIB_SPD4 | TRUE | FALSE | FALSE | 0X00000000 | Indx-9 | Speed Change to 4 |
| BURSTY_CALIB_DSS4 | TRUE | FALSE | FALSE | 0X00000000 | Indx-10 | DSS Restore at Speed4 |
| BURSTY_CALIB_DSSDONE | TRUE | FALSE | FALSE | 0X00000000 | Indx-11 | DSS Restore at ErrSpd |
| BURSTY_CALIB_IFC | TRUE | FALSE | FALSE | 0X00000000 | Indx-12 | IFC |

FIG. 3

********WRITE MODE********

400 →

| Calib_selection | Enbl? | VelCk? | Sdiag Disable? | Fmt/Cart Disable? | OUTBOUND |
|---|---|---|---|---|---|
| BURSTY_CALIB_NONE | TRUE | FALSE | FALSE | 0X00000000 | Indx-0 Not a sticky/bursty condition |
| BURSTY_CALIB_GLBCLK | FALSE | FALSE | FALSE | 0X00000000 | Indx-1 Disable Global Clock |
| BURSTY_CALIB_PLL | FALSE | FALSE | FALSE | 0X00000000 | Indx-2 Chance clock settings |
| BURSTY_CALIB_SS | TRUE | FALSE | FALSE | 0X00000000 | Indx-3 Saved Set Restore |
| BURSTY_CALIB_VPD | TRUE | FALSE | FALSE | 0X00000000 | Indx-4 VPD Restore |
| BURSTY_CALIB_ERASE | FALSE | FALSE | FALSE | 0X00000000 | Indx-5 Erase |
| BURSTY_CALIB_DSSRUN | TRUE | FALSE | FALSE | 0X00000000 | Indx-6 DSS Restore |
| BURSTY_CALIB_SPD2 | TRUE | FALSE | FALSE | 0X00000000 | Indx-7 Speed Change to 2 |
| BURSTY_CALIB_DSS2 | FALSE | FALSE | FALSE | 0X00000000 | Indx-8 DSS Restore at Speed2 |
| BURSTY_CALIB_SPD4 | TRUE | FALSE | FALSE | 0X00000000 | Indx-9 Speed Change to 4 |
| BURSTY_CALIB_DSS4 | FALSE | FALSE | FALSE | 0X00000000 | Indx-10 DSS Restore at Speed4 |
| BURSTY_CALIB_DSSDONE | TRUE | FALSE | FALSE | 0X00000000 | Indx-11 DSS Restore at ErrSpd |
| BURSTY_CALIB_IFC | TRUE | FALSE | FALSE | 0X00000000 | Indx-12 IFC |

FIG. 4

************************************BURST LOG************************************

| Wrap | ****TEMP ERROR DATA** | | | | **ROLLING DSNUM*** | |
|---|---|---|---|---|---|---|
| | Wrp | SRgn | ERgn | Hex Flag | Trig Dsnum | Indx0 Dsnum |
| [ 0] | 000 | 005 | 000 | 0000 | 00000000 | 00000000 |
| [ 1] | 000 | 000 | 008 | 0000 | 0000008a | 00000035 |
| [ 2] | 000 | 008 | 000 | 0102 | 0000008a | 00000035 |
| [ 3] | 000 | 005 | 010 | 0000 | 00000099 | 00000035 |
| [ 4] | 000 | 010 | 000 | 0103 | 00000099 | 00000035 |
| [ 5] | 000 | 000 | 012 | 0000 | 000000b1 | 00000035 |
| [ 6] | 000 | 012 | 000 | 010d | 000000b1 | 00000035 |
| [ 7] | 002 | 005 | 000 | 0000 | 00000000 | 00000000 |
| [ 8] | 002 | 000 | 009 | 0000 | 00004542 | 000044d7 |
| [ 9] | 002 | 009 | 000 | 010d | 00004542 | 000044d7 |
| [10] | 003 | 026 | 000 | 0000 | 00000000 | 00000000 |
| [11] | 004 | 005 | 000 | 0000 | 00000000 | 00000000 |
| [12] | 004 | 000 | 008 | 0000 | 00008a1d | 000089c7 |
| [13] | 004 | 008 | 000 | 010d | 00008a1d | 000089c7 |
| [14] | 006 | 005 | 000 | 0000 | 00000000 | 00000000 |
| [15] | 006 | 000 | 010 | 0000 | 0000cff6 | 0000cf6a |
| [16] | 006 | 010 | 000 | 010d | 0000cff6 | 0000cf6a |
| [17] | 008 | 005 | 000 | 0000 | 00000000 | 00000000 |
| [18] | 008 | 000 | 009 | 0000 | 000114e9 | 00011495 |
| [19] | 008 | 009 | 0000 | 010d | 000114e9 | 00011495 |
| [20] | 010 | 005 | 000 | 0000 | 00000000 | 00000000 |
| [21] | 010 | 000 | 000 | 0000 | 000159fb | 0001598f |
| [22] | 010 | 009 | 009 | 010d | 000159fb | 0001598f |
| [23] | 012 | 000 | 000 | 0000 | 00000000 | 00000000 |

FIG. 5

ERROR BURST DETECTION AND AMELIORATION

BACKGROUND

The present invention relates to error detection, and more particularly, this invention relates to error burst detection and amelioration.

Error detection and control is important to any system in which data passes from one point to another. Error detection and control is particularly important in the data storage industries, as users rely on the integrity of the stored data for everything from day to day operation to long term archiving.

In a field or test environment implementing a tape-based data storage system, error bursts, which may include a large number of errors in a given time frame or in a given length of tape, are not easily identified since no permanent errors occur and data continues to transfer across the host/drive interface. Even if individual recovery is only transitory in nature, when it persists over long stretches of tape these error bursts can lead to host, command timeouts and excessive processing times that seriously degrade performance. These bursts are often directional in nature, with reported cases of single wrap processing time in excess of 2 hours.

There is therefore a need for effective and efficient ways of detecting and handling error bursts.

SUMMARY

A method according to one embodiment includes monitoring a data transfer operation for detecting temporary errors; determining whether an error burst has occurred based on the monitoring; if an error burst has occurred, altering a condition of the data transfer operation; monitoring the data transfer operation having the altered condition for detecting temporary errors; determining whether another error burst has occurred based on the monitoring of the data transfer operation having the altered condition; and if another error burst has occurred, altering another condition of the data transfer operation.

A method according to another embodiment includes monitoring a data transfer operation of a tape-based data storage system for detecting temporary errors; determining whether an error burst has occurred based on the monitoring; if an error burst has occurred, altering a condition of the data transfer operation; monitoring the data transfer operation having the altered condition for detecting temporary errors; determining whether another error burst has occurred based on the monitoring of the data transfer operation having the altered condition; and if another error burst has occurred, altering another condition of the data transfer operation.

A method in yet another embodiment includes determining when error bursts occur during a data transfer operation based on detected temporary errors; sequentially altering a condition of the data transfer operation according to a predefined sequence of alterations each time an error burst occurs.

A system according to one embodiment includes a processor and a computer-readable medium, the computer-readable medium having computer usable program code embodied therewith, which when executed by the processor causes the processor to perform one of the methods presented above.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of methods and systems for detecting and attempting to ameliorate burst errors during data transfer operations. Moreover, the following description describes methodology to detect and respond to error bursts during tape processing that may be related to read sensitivities to data written by other drives (interchange), write sensitivities to operating speed or channel calibration settings, or other reasons.

To place the described embodiments in a context and for illustrative purposes only, the following description will refer to a tape-based storage system. However, it should be kept in mind that the methodology described herein can be applied to any type of system where data is transferred, including but not limited to, telecommunications, non-storage based data transfer, etc.

In one general embodiment, a method includes monitoring a data transfer operation (e.g., read or write operation) for detecting temporary errors, determining whether an error burst has occurred based on the monitoring, if an error burst has occurred, altering a condition of the data transfer operation, monitoring the data transfer operation having the altered condition for detecting temporary errors, determining whether another error burst has occurred based on the monitoring of the data transfer operation having the altered condition, and if another error burst has occurred, altering another condition of the data transfer operation.

In another general embodiment, a method includes monitoring a data transfer operation of a tape-based data storage system for detecting temporary errors, determining whether an error burst has occurred based on the monitoring, if an error burst has occurred, altering a condition of the data transfer operation, monitoring the data transfer operation having the altered condition for detecting temporary errors, determining whether another error burst has occurred based on the monitoring of the data transfer operation having the altered condition, and if another error burst has occurred, altering another condition of the data transfer operation.

In another general embodiment, a method includes determining when error bursts occur during a data transfer operation based on detected temporary errors, and sequentially altering a condition of the data transfer operation according to a predefined sequence of alterations each time an error burst occurs.

In a further general embodiment, a system includes a processor and a computer-readable medium, the computer-readable medium having computer usable program code embodied therewith, which when executed by the processor causes the processor to perform a method as presented herein.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory, in the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as pan of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
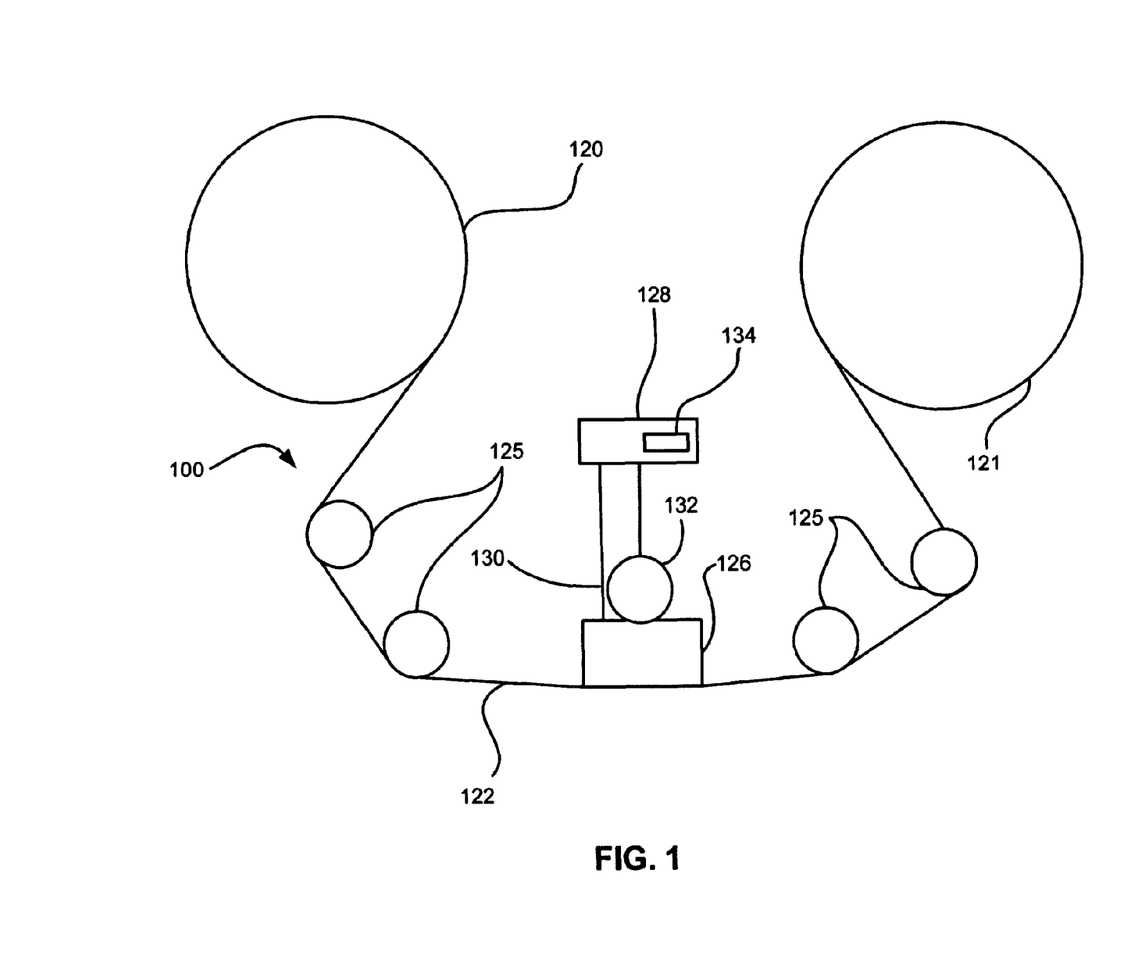
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the system 100. The tape drive, such as that illustrated in FIG. 1, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128, e.g., processor, typically controls head functions such as servo following, writing, reading, etc. and may be in communication with a computer-readable medium 134 such as a memory. The cable 130 may include read/write circuits to transmit data to the head 126 to be recorded on the tape 122 and to receive data read by the head 126 from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art. Moreover, the tape drive 100 may form part of a tape library system comprising a plurality of drives.

As noted above, error bursts have heretofore been difficult to detect and handle. Error burst management may include improving visibility to the conditions corresponding to error bursts by surfacing of unique fault symptom codes (fsc's) to the host which identify ongoing error burst handling as well as error burst permanent errors, or "perms." These fsc's also facilitate the collection of drive dumps for both failure analysis and feedback for possible improvements to error burst management algorithms.

Since bursts tend to be directional, they may be identified on the basis of temp rate and/or proximity on a given wrap, where a wrap is one wrap out or wrap in of the tape from or back onto the spool of the host cartridge. For example, error bursts may be defined based on the number of times temporary errors, or "temps", occur in a particular time period, spatially along the tape, etc.

Figure 2:
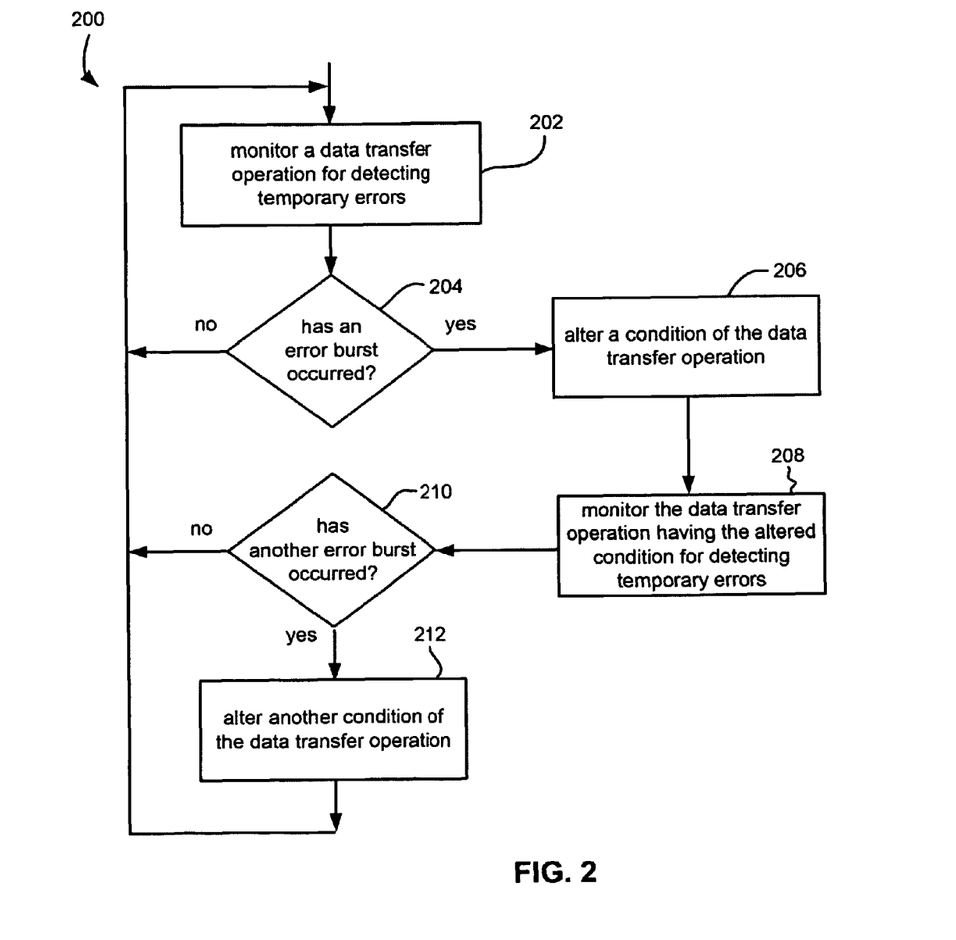
FIG. 2 is a flow diagram of a method according to one embodiment.

FIG. 2 illustrates a method 200 according to one embodiment. As an option, the present method 200 may be implemented in the context of the functionality and architecture of FIG. 1. Of course, the method 200 may be carried out in any desired environment. It should also be noted that the aforementioned definitions may apply during the present description.

With continued reference to FIG. 2, in operation 202, a data transfer operation (e.g., read or write operation) Is monitored for detecting temporary errors. In the present example, a tape-based data storage system is performing the data transfer operation, the data transfer operation being at least one of a read and a write operation.

In operation 204, a determination Is made as to whether an error burst has occurred based on the monitoring. The determination of whether the error burst has occurred may be based at least in part on at least one of a rate of the temporary errors and a proximity of the temporary errors relative to each other e.g., a number of temps in a given length of tape exceeds a threshold, temps occur within a given distance along the tape of each other, etc. See the section below entitled "BURST IDENTIFICATION (TRIGGER THRESHOLDS)" for more illustrative methodology for identifying error bursts.

In operation 206, if an error burst has occurred, a condition of the data transfer operation is altered in an attempt to prevent future error bursts. For example, one of the conditions of the data transfer operation that is changed is selected from a group consisting of channel calibration, clocking speed, and tape speed. Other conditions may also or alternatively be changed.

In operation 208, the data transfer operation having the altered condition is monitored for detecting temporary errors.

In operation 210, a determination is made as to whether another error burst has occurred based on the monitoring of the data transfer operation having the altered condition. The determination constraints and parameters may be the same or similar to those used in operation 204. Alternatively, they may be different, as exemplified below in the section entitled "BURST IDENTIFICATION (TRIGGER THRESHOLDS) ."

If another error burst, is discovered, then it is likely that the prior alteration of conditions did not effectively ameliorate the cause of the errors, and so another corrective action is tried. Accordingly, in operation 212, if another error burst has occurred, another condition of the data transfer operation is altered. This may include altering one or more previously altered conditions, altering conditions previously unaltered, etc. Moreover, previously altered conditions may remain altered, may revert to a default setting, etc.

Preferably, the alterations of the conditions in both tape wrap directions are applied sequentially according to a predefined sequence, wherein, the sequence is reset when a tape wrap direction is reversed. Once sequential progress through the option table for a given direction and mode (e.g., read vs. write) is started, then the sequence may not reset at the beginning of the next wrap in that same direction and mode. Instead it may resume at the last option tried for that direction and mode, and continue to iterate. Accordingly, while the same general sequence may be used for each tape wrap direction, the sequence applied in each tape wrap direction is independently controlled. See the section below entitled "OPTION TABLE" for an example of a sequence.

In one illustrative mode of operation, when an error burst is detected, then a change in channel calibration, clocking speeds or tape speed is imposed. These options are defined and sequenced in a microcode table organized by mode (read vs. write), direction (forward vs. backward), and drive type. The table is an iterative table, hence the name rolling calibration table. If the error burst persists, then the next option in the table is applied until the error burst dissipates or until wrap-turn. A subsequent burst that occurs in another wrap of the same direction and mode may restart table options at the last sequence tried.

Figure 3:
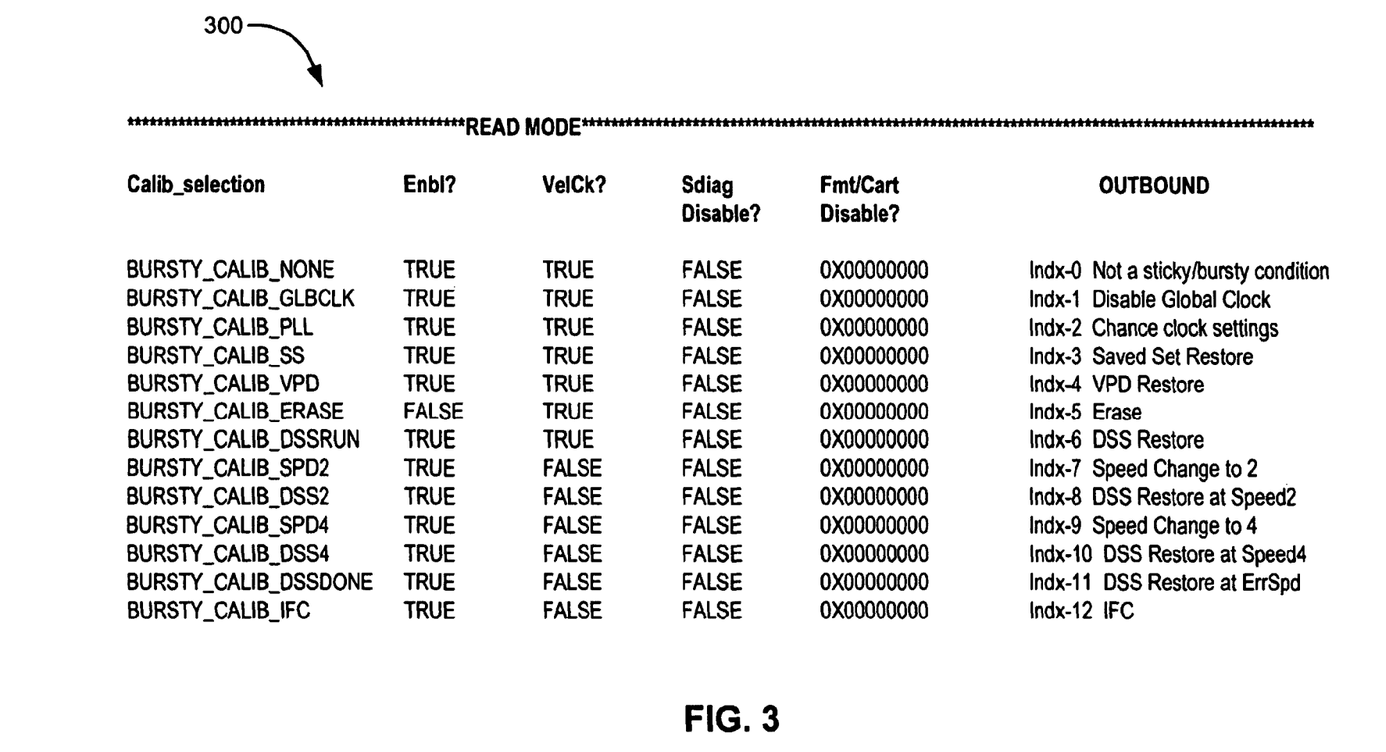
FIG. 3 is an illustration of an example of the forward direction (outbound) rolling calibration table for a read mode for an illustrative type of tape drive.
Figure 4:
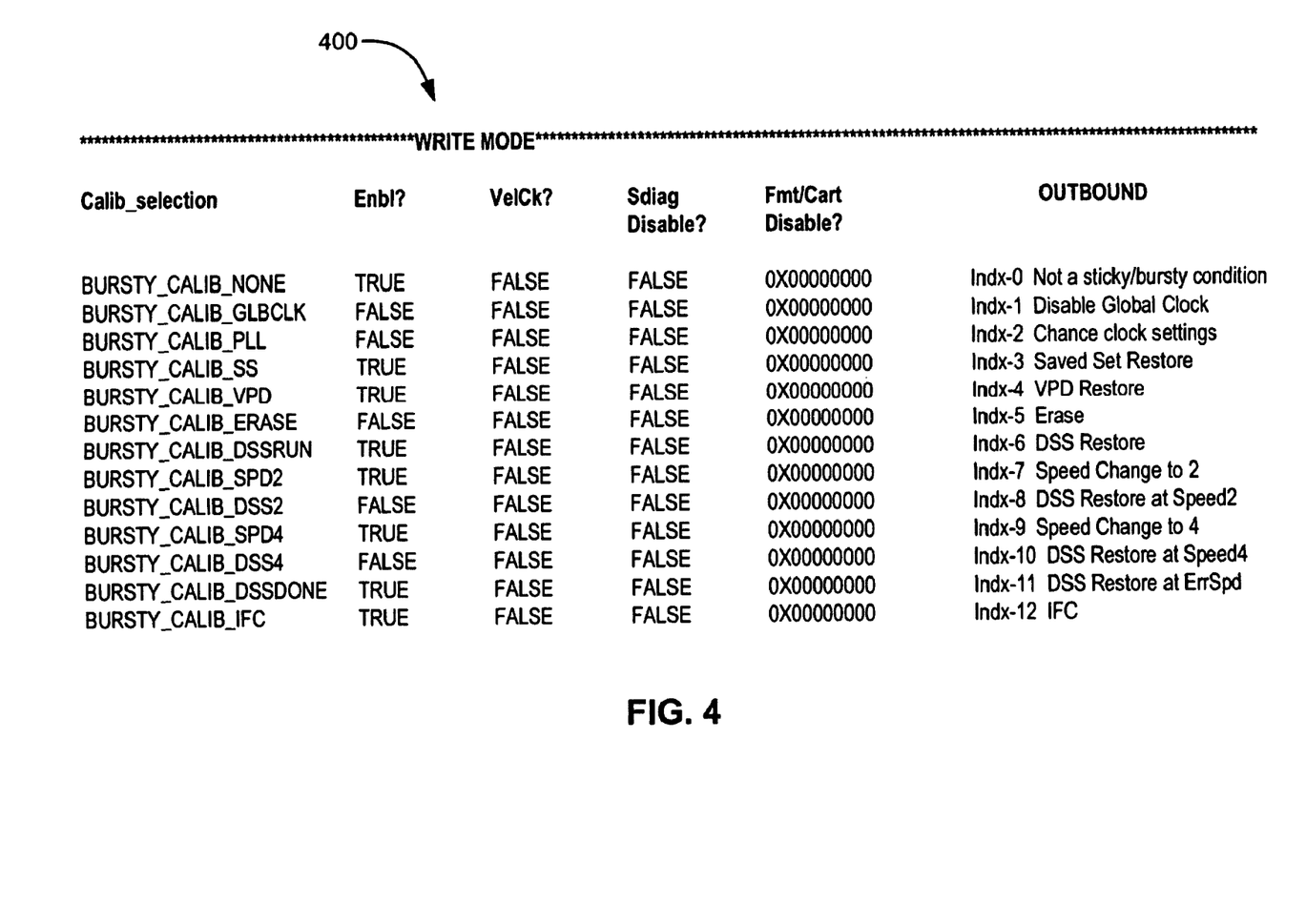
FIG. 4 is an illustration of an example of the forward direction (outbound) rolling calibration table for a write mode for the illustrative type of tape drive.

In particularly preferred embodiments, for a subsequent data transfer operation in a given wrap direction, a last successful altered condition applied during a previous data transfer operation in the same wrap direction is applied to the subsequent data transfer operation upon determining that an error burst has occurred during the subsequent data transfer operation. For example, error burst handling may "learn" directionally. As data processing continues over multiple wraps, the error burst response may apply the last-best option for that direction based on error burst history for the mount. For example, a forward wrap error burst may start applying options at the last applied forward offset in the rolling calibration table, rather than restarting from the beginning. Accordingly, a previously-successful condition alteration that resolved a problematic burst is applied as the first option if a subsequent error burst, occurs in a same tape wrap direction and mode on a different wrap Option Table FIG. 3 shows an example of the forward direction (outbound) rolling calibration table 300 for a read mode for an illustrative type of tape drive. FIG. 4 shows an example of the forward direction (outbound) rolling calibration table 400 for a write mode for the illustrative type of tape drive. Note that such tables may be populated with different options and different sequences for each drive type and/or mode. Note also that, these figures show both write and read sharing the same set of options as defined in the first column of each table. However, the value in the second column (Enbl?) determines whether it is a valid option for that mode. It is possible to disable rolling calibration options externally via the host Send Diagnostic command. If this is done, then the appropriate row of the 'SDiag Disable?' column is set to TRUE and the option is then blocked regardless of the value in the 'Enbl?' column. The 'VelCk?' column allows/prohibits the checking of speed-limitation logic as well as rolling calibration logic. The 'Fmt/Cart Disable?' column is for dynamic limitations of calibration options based on loaded cartridge type and/or data format. The "OUTBOUND" column indicates the condition that is altered. Other columns may be included, e.g., for dynamic bookkeeping of dataset numbers related to burst triggers.

A separate table and pointer are preferably maintained for write vs. read, and forward vs. backward for each. Sequencing begins at Index=0 through Index=12 and then, wraps back to the top for another iteration.

On multiple passes through a given table, certain options can be skipped based on past performance. For example, a previously-attempted option that was ineffective or made conditions worse can be skipped.

Also, a pass limitation can be applied for a given wrap on the assumption that rolling calibration is having no effect on the error rate.

Redundant Options

Some calibration table options may be actions that nominal error recovery methods, e.g., those taken by the drive, can also take. Accordingly, it may be desirable for rolling calibration logic to avoid repeating the redundant actions. In one approach, if an error recovery procedure has been attempted to correct one of the temporary errors and was ineffective, then a condition that is about the same as a condition imposed by the error recovery procedure is not used.

In preferred approaches, some actions may be included in the rolling calibration table in order to manage error bursts made up of short-duration error recovery sessions. The nature of this kind of error burst is that the nominal error recovery sessions never require enough retry to attempt a calibration change. So, without an adjustment to channel calibration repetitive temps continue to occur until burst detection logic triggers to make that optimization. Note that burst detection logic may also monitor actions taken by nominal error recovery between burst triggers and on the current wrap half. This is an efficiency step done to skip one or more rolling calibration options if nominal recovery has already used them without success. Some redundancy may also be assessed on a wrap-basis.

Burst Identification (Trigger Thresholds)

There may be numerous triggers involved in burst detection that are related to the host command, to the background temporary error rate, and to the sequencing rate down the rolling calibration table once an error burst is detected. Three formal triggers are defined, though others may be used in addition to these or alternatively thereto. All triggers may reset on load, wrapturn, and/or on reposition.

Default Trigger Threshold

Upon reaching a predetermined number of temps, an error burst may be called. Again, a temporal and/or spatial limitation may also be applied in determining whether an error burst has occurred.

In one illustrative embodiment, used in the following example, assume that 12 temporary errors on a given wrap must occur before a burst can be identified. This is the default trigger.

Decelerated Trigger Threshold

At any given time, the burst trigger threshold may be set to either the default or accelerated value, if a burst trigger has tripped, but more than 200 datasets have been processed since the last trigger (or if no trigger, 200 datasets from the first temp on the current wrap), then the burst trigger may be ignored. The temp error counters are reset and burst detection is deferred to the next trigger. If this wrap has already experienced an error burst, then the rolling calibration that was selected stays in effect and is not changed.

Accelerated Trigger Threshold

In some approaches, an accelerated threshold may be used in the determination of whether another error burst has occurred, the accelerated threshold having less temporary errors than a threshold used in the first determining operation. Continuing with the illustrative example, assume under the accelerated threshold, 6 temporary errors on a given wrap must occur before a burst can be identified. The accelerated trigger is enabled by one or more of the following conditions. It is disabled (default trigger restored) when more than 100 datasets have been processed since the last trigger.

- Clusters: the last burst trigger and the current burst trigger each spanned <50 datasets
- Dynamic: an error burst has been detected and a rolling calibration applied, but after 6 temps less than 25 datasets have been read. Since a rolling calibration option could be ineffective or potentially make the error burst worse, this accelerated trigger allows for rapid sequencing to the next rolling calibration option.
- Time: if an error burst condition exists and read/write processing on this wrap has exceeded 20 minutes but is not due to a slow host (>25% of this time must have been involved in error recovery)
- Positioning Read: Space or locate is in progress. The host command timeouts are shorter than for read/write, so burst detection is made more sensitive
- Forced Speed Change: A section of the rolling calibration table is involved in imposing various speed changes. Since these could aggravate the temp rate, burst detection is forced to use an accelerated trigger
- Write Sync/Flush: Host command timeouts are shorter so burst detection is made more sensitive.

Excessive Recovery

Preferably, an error code is generated if the data transfer operation in a single wrap exceeds a predefined time limit. More preferably, an error code that terminates further processing is generated if the data transfer operation in a single wrap exceeds a predefined time limit and a predefined portion of the time limit is spent in error recovery on that wrap. For example, in cases of read/write error bursts on a given wrap which are not responsive to rolling calibration changes, excessive recovery may be terminated by forcing a permanent error with a unique fsc. The drive/cartridge can then be pulled for failure analysis and feedback for possible improvement to burst management algorithms. On detection of a burst condition, if the time-in-wrap has exceeded some predefined time limit, e.g., 40 minutes, then a perm error may be forced. To compensate for slower systems, the time involved in error recovery may be considered. For example, the aforementioned perm error may be forced only if >25% of that time is involved in error recovery. When near end-of-wrap (EOW), the excessive recovery timeout may be deferred to allow host processing to continue. This may be done because error bursts are often directional in nature, so that on wrapturn nominal R/W performance typically resumes. The determination of "near-EOW" varies depending on such things as capacity scaling where the full wrap length is not used.

External Notification

Various error codes, reports, etc. may be output to report burst, triggers, changes made in reaction to a burst, etc. These error codes may be informational and preferably do not terminate host processing to the mounted cartridge.

As mentioned, error bursts that seriously degrade drive performance can easily go unnoticed when permanent errors don't occur. In order to post notification of these events to the attached host system, error messages such as unique fsc's may be logged as informational errors during burst processing. The Request Sense data may also summarize burst action taken. Further, a message such as a code, burst log, etc. may be output to indicate a number of error bursts determined to have occurred. Moreover, a message such as a code, burst log, etc. may be output to indicate a result of the altering the condition.

Any permanent errors forced by burst management may also have unique fsc's. These help to identify problem drives and/or tape volumes as well as to facilitate the collection of drive dumps for failure analysis.

Burst Log

Figure 5:
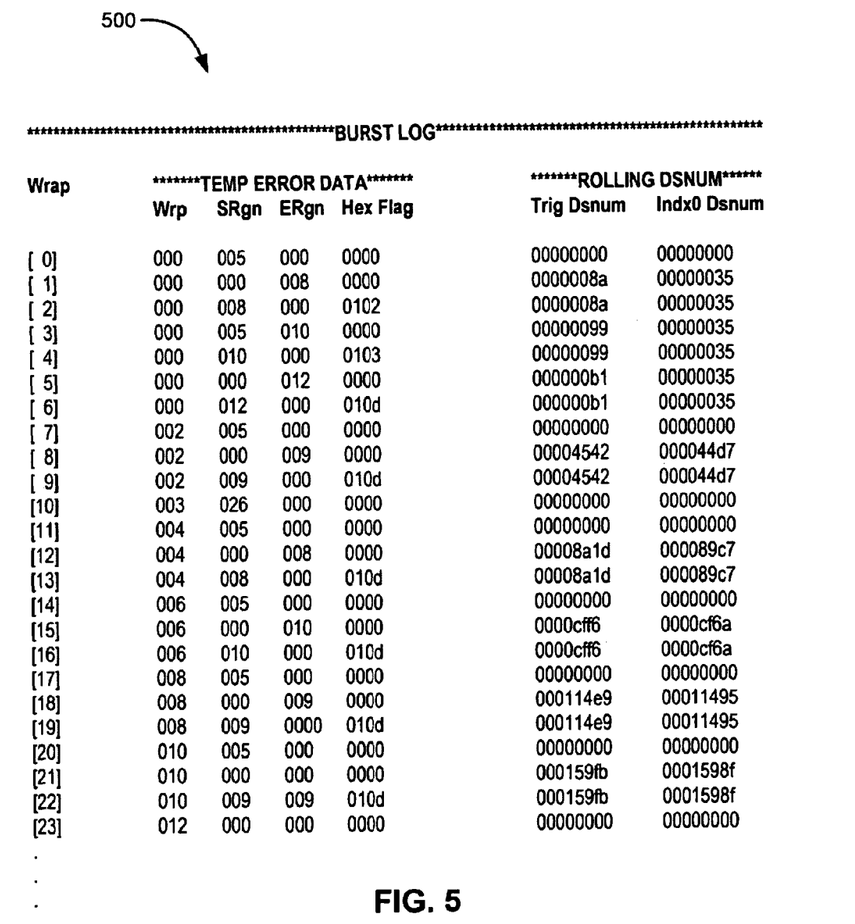
FIG. 5 is an illustration of a burst log according to one embodiment.

As an example of error burst data maintained in the dump file, FIG. 5 has an edited version of a burst log 500 which summarizes rolling calibration reaction to a systematic write error burst. Columns shown include those indicating the problem wrap ('Wrp') and specific action taken ('Hex Flag'). Values in the "Hex Flag" column not having all 0 values represent error burst triggers. The first character of the 'Hex Flag' column in these trigger rows represents the number of iterations through the option table and the second represents the detailed calibration action. Relative position on the wrap is identified by a region value which ranges from 1 (beginning of tape) to 127 (end of tape). Two region columns exist to indicate start/end of a burst trigger interval ("SRgn" and "ERgn"). Note that, in this illustrative dump, most of the initial write bursts occur on even (forward direction) wraps near the beginning of the tape.

Learning is demonstrated on wrap 0 where three options were applied prior to resolving the error burst. According to the log, on wrap 0 the first temp occurred at dataset 0x35 ("Indx0 dsnum") with write burst triggers ("Trig Dsnum") at datasets 0x8A (option 2 applied as indicated by final bit in "Hex Flag' column), 0x99 (option 3 applied), and 0xB1 (option d applied).

Option d cleared the error burst until wrap turn, so on this wrap the error burst spanned a total of 125 datasets (0xB1-0x35). The log shows similar error bursts occurring in about the same location on all subsequent even wraps (forward direction). Rolling calibration started with the last successful forward wrap option, which was option d. This proved successful in all cases, which shortened the burst resolution period on later wraps (spanned between 6 to 110 datasets, with an estimated reduction of 2 minutes forward wrap processing time).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
monitoring a data transfer operation for detecting temporary errors;
determining whether an error burst has occurred based on the monitoring;
if an error burst has occurred, altering a condition of the data transfer operation;
monitoring the data transfer operation having the altered condition for detecting temporary errors;
determining whether another error burst has occurred based on the monitoring of the data transfer operation having the altered condition; and
if another error burst has occurred, altering another condition of the data transfer operation.

2. A method as recited in claim 1, wherein the determination of whether the error burst has occurred is based on at least one of a rate of the temporary errors and a proximity of the temporary errors relative to each other.

3. A method as recited in claim 1, wherein a data storage system is performing the data transfer operation, the data transfer operation being at least one of a read and a write operation.

4. A method as recited in claim 3, wherein one of the conditions of the data transfer operation that is changed is selected from a group consisting of channel calibration, clocking speed, and tape speed.

5. A method as recited in claim 1, wherein a data storage system is performing the data transfer operation by writing and/or reading data on a tape in two tape wrap directions, wherein alterations of the conditions in both tape wrap directions are applied sequentially according to predefined sequences of the alterations, wherein the sequence applied in each tape wrap direction is independently controlled.

6. A method as recited in claim 5, wherein for a subsequent data transfer operation in a given wrap direction, a last successful altered condition applied during a previous data transfer operation in the same wrap direction is applied to the subsequent data transfer operation upon determining that an error burst has occurred during the subsequent data transfer operation.

7. A method as recited in claim 3, further comprising generating an error code that terminates further processing if the data transfer operation in a single wrap exceeds a predefined time limit and a predefined portion of the time limit is spent in error recovery on that wrap.

8. A method as recited in claim 1, wherein the alterations of the conditions are applied sequentially according to a predefined sequence.

9. A method as recited in claim 1, wherein if an error recovery procedure has been attempted to correct one of the temporary errors and was ineffective, a condition that is about the same as a condition imposed by the error recovery procedure is not used.

10. A method as recited in claim 1, wherein an accelerated threshold is used in the determination of whether another error burst has occurred, the accelerated threshold having less temporary errors than a threshold used in the first determining operation.

11. A method as recited in claim 1, further comprising outputting a message indicative of at least one of a number of error bursts determined to have occurred and a result of the altering the condition.

12. A method as recited in claim 1, further comprising receiving an instruction from an external interface for controlling a behavior of further alterations of conditions of the data transfer operation.

13. A method, comprising:
monitoring a data transfer operation of a tape-based data storage system for detecting temporary errors;
determining whether an error burst has occurred based on the monitoring;
if an error burst has occurred, altering a condition of the data transfer operation;
monitoring the data transfer operation having the altered condition for detecting temporary errors;
determining whether another error burst has occurred based on the monitoring of the data transfer operation having the altered condition; and
if another error burst has occurred, altering another condition of the data transfer operation.

14. A method as recited in claim 13, wherein one of the conditions of the data transfer operation that is changed is selected from a group consisting of channel calibration, clocking speed, and tape speed.

15. A method as recited in claim 14, wherein alterations of the conditions in both tape wrap directions are applied sequentially according to a predefined sequence, wherein the sequence applied in each tape wrap direction is independently controlled.

16. A method as recited in claim 15, wherein for a subsequent data transfer operation in a given wrap direction, a last successful altered condition applied during a previous data transfer operation in the same wrap direction is applied to the subsequent data transfer operation upon determining that an error burst has occurred during the subsequent data transfer operation.

17. A method, comprising:
determining when error bursts occur during a data transfer operation based on detected temporary errors;
sequentially altering a condition of the data transfer operation according to a predefined sequence of alterations each time an error burst occurs.

18. A method as recited in claim 17, wherein an independently controlled sequence is used when a tape wrap direction is reversed.

19. A method as recited in claim 17, wherein a previously-successful condition alteration that resolved a problematic burst is applied as the first option if a subsequent error burst occurs in a same tape wrap direction and mode on a different wrap.

20. A system, comprising:
a processor configured to:
determine when error bursts occur during a data transfer operation based on detected temporary errors; and
sequentially alter a condition of the data transfer operation according to a predefined sequence of alterations each time an error burst occurs.

21. A system as recited in claim 20, further comprising:
a magnetic head in communication with the processor; and
a drive mechanism for passing a magnetic recording tape over the head.

22. A system as recited in claim 20, wherein the data transfer operation is a read operation from a magnetic recording tape, wherein the processor is configured to perform the operations via computer usable program code embodied on a computer readable medium, which when executed by the processor causes the processor to perform the operations.

23. A system, comprising:
a processor configured to:
monitor a data transfer operation for detecting temporary errors;
determine whether an error burst has occurred based on the monitoring;
alter a condition of the data transfer operation when an error burst has occurred;
monitor the data transfer operation having the altered condition for detecting temporary errors;
determine whether another error burst has occurred based on the monitoring of the data transfer operation having the altered condition; and
alter another condition of the data transfer operation when another error burst has occurred.

24. A system as recited in claim 23, further comprising:
a magnetic head in communication with the processor; and
a drive mechanism for passing a magnetic recording tape over the head.

25. A system as recited in claim 23, wherein the data transfer operation is a read operation from a magnetic recording tape, wherein the processor is configured to perform the operations via computer usable program code embodied on a computer readable medium, which when executed by the processor causes the processor to perform the operations.

* * * * *